United States Patent
Chen et al.

(10) Patent No.: US 9,314,731 B2
(45) Date of Patent: Apr. 19, 2016

(54) RTSA METHOD USING ADSORBENT STRUCTURE FOR CO2 CAPTURE FROM LOW PRESSURE AND LOW CONCENTRATION SOURCES

(71) Applicant: L'Air Liquide Societe Anonyme pour l'Etude et l'Exploitation des Procedes Georges Claude, Paris (FR)

(72) Inventors: Yudong Chen, Garnet Valley, PA (US); Christian Monereau, Montpellier (FR); Edgar S. Sanders, Jr., Newark, DE (US); Pascal Tessier, Wilmington, DE (US)

(73) Assignee: L'Air Liquide, Société Anonyme pour l'Etude et l'Exploitation des Procédés Georges Claude, Paris (FR)

(*) Notice: Subject to any disclaimer, the term of this patent is extended or adjusted under 35 U.S.C. 154(b) by 135 days.

(21) Appl. No.: 14/084,945

(22) Filed: Nov. 20, 2013

(65) Prior Publication Data

US 2015/0135952 A1    May 21, 2015

(51) Int. Cl.
*B01D 53/04*    (2006.01)
*B01J 20/08*    (2006.01)
*B01D 53/06*    (2006.01)

(52) U.S. Cl.
CPC ........ *B01D 53/0462* (2013.01); *B01D 53/0438* (2013.01); *B01D 53/06* (2013.01);
(Continued)

(58) Field of Classification Search
CPC ............... B01D 53/04; B01D 53/0438; B01D 53/0462; B01D 53/06; B01D 53/261; B01D 2256/10; B01D 2257/504
USPC ............. 95/113–115, 117, 139, 148
See application file for complete search history.

(56) References Cited

U.S. PATENT DOCUMENTS

| 3,186,144 A | 6/1965 | Dow |
| 3,405,507 A | 10/1968 | Spencer et al. |

(Continued)

FOREIGN PATENT DOCUMENTS

| DE | 198 05 011 | 8/1999 |
| DE | 198 49 389 | 5/2000 |

(Continued)

OTHER PUBLICATIONS

International Search Report and Written Opinion for related PCT/US2014/066717, Mar. 24, 2015.

(Continued)

*Primary Examiner* — Frank Lawrence
(74) *Attorney, Agent, or Firm* — Elwood L. Haynes

(57) ABSTRACT

A Temperature Swing Adsorption method for separating a first component, comprising a more adsorbable component, from a feed stream comprising more than 50 mol % of a second component, comprising a less adsorbable component, is provided. The method includes providing an adsorbent structure suitable for adsorbing the first component, the structure being of the parallel passage contactor type, and cyclically implementing the following steps. Passing the feed stream through the adsorbent structure thus adsorbing the first component and producing a stream depleted in the first component and enriched in the second component. Heating the adsorbent structure to desorb the adsorbed first component by means of circulating a heating stream enriched in the first component at a temperature suitable for regeneration. And cooling the structure by means of passing through it more than 50% of the stream enriched in the second component produced in the step a).

33 Claims, 3 Drawing Sheets

(52) U.S. Cl.
CPC ..... *B01D2253/108* (2013.01); *B01D 2253/342* (2013.01); *B01D 2253/3425* (2013.01); *B01D 2256/10* (2013.01); *B01D 2257/504* (2013.01); *B01D 2257/80* (2013.01); *B01D 2258/0233* (2013.01); *B01D 2258/0283* (2013.01); *B01D 2259/40001* (2013.01); *B01D 2259/403* (2013.01); *B01D 2259/404* (2013.01); *B01D 2259/40011* (2013.01); *Y02C 10/08* (2013.01)

(56) References Cited

U.S. PATENT DOCUMENTS

| | | | |
|---|---|---|---|
| 3,458,973 | A | 8/1969 | Spencer et al. |
| 4,421,532 | A * | 12/1983 | Sacchetti et al. ............. 95/104 |
| 5,032,156 | A * | 7/1991 | Luder et al. ................. 96/107 |
| 5,069,038 | A * | 12/1991 | Peinze ......................... 62/636 |
| 5,158,582 | A * | 10/1992 | Onitsuka et al. ............. 95/129 |
| 5,308,457 | A | 5/1994 | Dalla Betta et al. |
| 5,505,825 | A | 4/1996 | Gold et al. |
| 5,667,713 | A | 9/1997 | Kuma |
| 5,693,123 | A | 12/1997 | Klobucar |
| 6,033,457 | A | 3/2000 | Lawless |
| 7,172,645 | B1 | 2/2007 | Pfister et al. |
| 8,936,727 | B2 * | 1/2015 | Dunne et al. ................. 210/670 |
| 8,940,072 | B2 | 1/2015 | Boulet et al. |
| 2002/0022146 | A1 | 2/2002 | Keefer et al. |
| 2003/0037672 | A1 | 2/2003 | Sircar |
| 2004/0118279 | A1 | 6/2004 | Kalbassi et al. |
| 2004/0118287 | A1 | 6/2004 | Jaffe et al. |
| 2008/0314245 | A1 * | 12/2008 | Hershkowitz et al. .......... 95/115 |
| 2012/0152116 | A1 * | 6/2012 | Barclay et al. ................. 95/113 |
| 2013/0152787 | A1 | 6/2013 | Boulet et al. |

FOREIGN PATENT DOCUMENTS

| | | |
|---|---|---|
| EP | 1 382 375 | 1/2004 |
| EP | 1 413 348 | 4/2004 |
| GB | 2 398 522 | 8/2004 |
| WO | WO 2015 077510 | 5/2015 |
| WO | WO 2015 077513 | 5/2015 |
| WO | WO 2015 102765 | 7/2015 |

OTHER PUBLICATIONS

International Search Report and Written Opinion for related PCT/US2014/066720, Feb. 16, 2015.
International Search Report and Written Opinion for related PCT/US2014/066724, Jul. 21, 2015.
Rezai, F. et al., "Structured adsorbents in gas separation processes," Separation and Purification Technology, Elsevier Science, Amsterdam, NL, Jan. 12, 2010, vol. 70, No. 3, 243-256.
International Search Report and Written Opinion for corresponding PCT/US2014/066721, Jan. 18, 2016.

* cited by examiner

RTSA METHOD USING ADSORBENT STRUCTURE FOR CO2 CAPTURE FROM LOW PRESSURE AND LOW CONCENTRATION SOURCES

BACKGROUND

Interest in the recovery of CO2 from various CO2 containing gas mixture has been fueled by multiple factors: the merchant CO2 market, enhanced oil recovery (EOR) and greenhouse gas emissions reduction. However, the majority of CO2 sources are from low pressure gas mixtures having a relatively low concentration of CO2. Such sources, for example, include the flue gas from a fossil fuel-fired power plant, an industrial furnace, a cement kiln, an oxy or air combustion facility, or the exhaust gas of an engine or lime kiln. Typically, the flue gas is obtained at near ambient pressure (<3 Bara). The concentration of CO2 in the flue gas ranges from approximately 5 to 30%, with a balance of mostly nitrogen. The flue gas flow rate may be considerable.

Conventionally, most commercial CO2 recovery plants use processes based on chemical absorption with a monoethanolamine (MEA) solvent. MEA was developed over 60 years ago for removing CO2 and H2S from natural gas streams. However, this process suffers from large equipment costs and high regeneration energy requirements. Recently, a CO2 CPU (compression and purification unit) process was proposed to capture the CO2 from the off gas of a H2 PSA (pressure swing adsorption) treating a syngas coming from a SMR (steam methane reforming) plant. The benefit of the process is that the waste gas from the CPU plant, which normally contains significant amounts of H2 at high pressure, can be recycled back to the H2 PSA for additional H2 production credit. But the CPU process which requires high compression and cold temperature operation is not economically interesting when the CO2 concentration in the feed is low, such as in the case of flue gas.

The typical cycle time of a standard TSA is considerably more than one hour. Considering an example of Front End Purification (FEP) unit upstream an Air Separation Unit (ASU), which is one of the most advanced designs for a TSA unit, the adsorption time is usually between 2 or 4 hours. Heating plus cooling times takes 1.5 hr to 3.5 hr, and the remaining time corresponding to secondary steps, like depressurization, repressurization and possibly idle time as a margin. For large air flow, the adsorbers are normally designed to be a radial flow type, providing a large passage section for the air (50 m2 for instance) with relative short bed (less than 1 meter thick).

When trying to reduce the cycle time to less than 1 hour, one faces several problems. In order to be efficient enough in the removal of the impurities present in atmospheric air (water, CO2, C2H4, C3H8, N2O), the size of the adsorbent, bead or pellet, has to be reduced accordingly to maintain the same ratio of saturation zone/mass transfer zone. Instead of the 2 mm standard diameter, it leads to beads having a diameter of less than 1 mm, in the range of 0.5 mm with a target of an adsorption time around 15 minutes. With such an adsorbent particle size, limiting the pressure drop leads to non-industrial geometry with large section for the gas and particularly very short bed, in the order of 10 centimeters. Gas distribution in such adsorbers added to the construction tolerances to be respected, makes these designs unrealistic.

In the past decade, solutions were proposed to both decrease pressure drop (and avoid fluidization of the adsorbent) and increase the mass transfer rate. Different types of structured adsorbent were described and proposed for shorten the cycle time of Adsorption unit (PSA or TSA). For a complete review of the subject, one can refer to the document "Structured adsorbents in gas separation processes" by F. Rezaei and P. Webley in Separation and Purification Technology.

In the case of CO2 capture, the flue gas is near atmospheric pressure and the energy cost of any pressure drop to be compensated by a compression means is tremendous and quickly makes the process uneconomic. For such a target, the adsorbent structure with the less pressure drop is to be selected. The preferred geometries will be the one with a direct passage for the gas. We call such adsorbent structures "parallel passages contactor". They are of different types: monoliths (or honeycomb), laminates, fabrics, fibers bundle.

Monolith is entirely comprised of adsorbent with a binder to solidify the structure which is directly extruded. The gas passage consists of parallel channels going straight right from one side (inlet) to the other (outlet). The term of honeycomb structure is often used to describe this kind of contactor.

In case of laminate, the adsorbent is deposed or grown up on a substrate support, for instance a sheet of special paper or a metallic grid . . . which is packed or rolled; if necessary, spacers are used to maintain a channel for the gas to flow through the structure.

A relative similar structure can be obtained with adsorbent fabrics (or cloths) in stacking parallel sheets or making a spiral wound adsorber. The gas passage is parallel to the surface of the fabrics (and not across the fabrics as in some filter).

Less common is fibers bundle, which is somewhere similar in geometry to permeation unit. The gas flows outside and/or inside the fibers (if hollow fibers) which are made from or covered with adsorbent.

Not only these parallel passages contactors will decrease dramatically the pressure drop in comparison with conventional particles adsorbent bed but they can increase by several folds the mass transfer and the local heat transfer of the system. This is realized through the small thickness of the adsorbent layer. We call "effective thickness" the length to be penetrated by the gas to reach all the adsorbent sites. In case of an adsorbent supported on an inert sheet, the effective dimension is directly the thickness of the layer (case of laminate . . . ). When the gas flows both sides of a wall consisting in adsorbent material, the effective thickness is half the thickness of the wall. Adsorbent effective thickness is often reported to be in the range 50 to 200 microns for efficient mass transport while the gas channels are in the range 100 to 400 microns. In case of supported adsorbent, the support itself is around 50 to 100 microns.

The main drawback of these structures is the adsorbent loading (per adsorber volume). For a standard bead bed, with a dense loading, one can obtain a 65% loading. Using the newly developed binderless adsorbent, the effective loading (i.e. counting only the active material) is also about 65%. If we compare with a laminate structure (support 50/layer 100/channel 200 microns), we obtain a 44% loading or taking into account the necessary binder (80/20) an effective loading of about 35%. For a low pressure application, such a design will lead to too much pressure drop and the width of the channel should be increased to about 1 mm. The effective loading will decrease down to 13%. It means that most of the gain expected in shortening the TSA cycle will be lost due to a low volumetric adsorbent load.

A second problem occurs when increasing the width of the gas channel. The film (or bulk) resistance i.e. in the gas flow itself increases, thus limiting the mass transfer and the local heat transfer (from the fluid to the adsorbent surface).

The gain in transport properties consecutive to the reduction of the adsorbent effective thickness and consequently the pore diffusion resistance will be less than expected due to the fact that the bulk resistance (external film resistance) will be pre-eminent. This means that the mass transfer zone will lengthen, that more adsorbent will not be saturated leading to a decrease in productivity.

Another difficulty is the heat transfer during the regeneration. In conversional TSA processes, the heat is brought through the circulation of a hot purge gas. The amount of purge gas available varies from one process to another. For the FEP upstream an ASU unit, the regeneration flow rate (nitrogen off-gas of the ASU) is for instance in the range of 10 to 30% of the air flow rate. When decreasing the cycle time, the trend is to increase that flow (one of the reasons is that the size of the heater, of the external piping . . . is not decreasing when shortening the cycle and thus that the time constant for the heat propagation to the adsorber remain the same, rather negligible for a 4 hours cycle but very sensitive for a 20 minutes cycle).

In case where the adsorbed species is the "valuable one", its concentration will be diluted in too much purge gas and the whole process becomes inefficient.

For that reason, several solutions have been proposed: each adsorber contains its own heater inside or just at the inlet to decrease heat capacity of the external equipments (piping, valve . . . ) to be heated; several heaters at different places in the adsorber; in situ electrical heating; micro waves . . . . Another solution proposed to increase heat transfer in and out of adsorbents by designing adsorbers as a heat exchanger type (including heat exchange tubes inside adsorbent bed or coating adsorbent onto surface of heat exchange tubes).

Use of a vacuum pump to help desorbing the adsorbed species without too much diluting them has been used for some particular applications (sub marine atmosphere maintenance . . . ).

All these solutions are expensive (investment, energy consumption) or difficult to extrapolate for large flow rates. As a direct consequence of these various disadvantages, CO2 capture by TSA process is not presently a well established process. The present invention is likely to change this point of view.

SUMMARY

A Temperature Swing Adsorption method for separating a first component, comprising a more adsorbable component, from a feed stream comprising more than 50 mol % of a second component, comprising a less adsorbable component, is provided. The method includes providing an adsorbent structure suitable for adsorbing the first component, the structure being of the parallel passage contactor type, and cyclically implementing the following steps. Passing the feed stream through the adsorbent structure thus adsorbing the first component and producing a stream depleted in the first component and enriched in the second component. Heating the adsorbent structure to desorb the adsorbed first component by means of circulating a heating stream enriched in the first component at a temperature suitable for regeneration. And cooling the structure by means of passing through it more than 50% of the stream enriched in the second component produced in the step a).

DESCRIPTION OF PREFERRED EMBODIMENTS

Figure 1A:
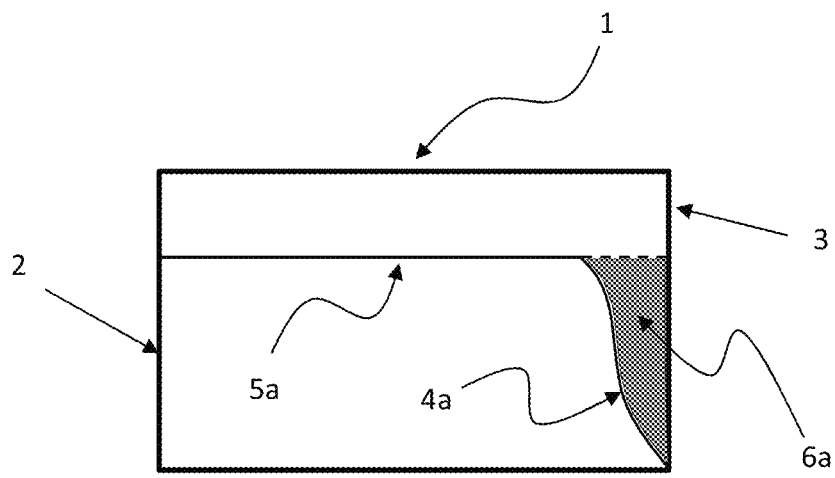
FIGS. 1A, 1B, and 1C are schematic representations of one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure A new TSA method using structured adsorbent bed is presented. The structured adsorbent beds could be of any type among the systems developed during the last decade as long as it avoids fluidization and notably decrease pressure drop. This includes monoliths, laminates, fabrics, bundle of fibers . . . .

The proposed method takes advantage of some particularities of the separation process, particularly true in the CO2 capture from a low pressure, low CO2 content (5 to 30% CO2 in essentially N2) stream, such as the fact that the target species is the most adsorbable, that complete removal of that species is not required, that the target species represent more than traces (at least a few mole %) but that the majority of the feed stream is not adsorbable (or weakly adsorbable) and that the residual gas enriched in the less adsorbable component exiting the adsorber has no real value and can be used as an utility for the TSA unit. The invention was developed with CO2 capture in mind but is not limited to that application. The proposed method can be used, for instance, to recover a large percentage of valuable species in a low pressure off-gas or purge gas (rare gas such as Krypton, Xenon . . . for instance in nitrogen as the main carrier gas, specialties gases dedicated to the electronic, medical . . . market diluted in inert gas).

The proposed invention utilizes a rapid thermal swing adsorption (RTSA) cycle to capture CO2 from low pressure and low concentration CO2 sources utilizing the recently developed structured adsorbent bed configurations (laminates, monoliths, fabrics, coated ceramic fiber . . . ) with a new operating process which allows for an economical use. This new compact design and process allow operating the thermal swing adsorption process at a much faster cycle speed than the conventional pellet or bead-loaded adsorbent bed, therefore to significantly increase $CO_2$ productivity without increasing the energy consumption. The design of this new rapid cycle thermal swing adsorption (RTSA) process has advantages of the same or even higher overall adsorbent loading per volume compared with beaded materials, it has enough mass transfer rate, much lower pressure drop and much fast heat transfer rates. As a result, the proposed technology ideally suits applications that involve large gas flow and are sensitive to pressure drop . . . . Success of this technology for $CO_2$ capture application will open up other opportunities as long as the "product" is the adsorbed components to be kept at high concentration and that these components are not in majority in the initial feed gas.

In addition to CO2 capture applications, the present invention can also be applied to other applications when one has to recover from a gas mixture one or more component (A1, A2 . . . ) which are more adsorbable than the remaining components (B1, B2 . . . ) which are not desirable in the "product".

Therefore, a temperature swing adsorption method is proposed for separating the most adsorbable component (A1, A2 . . . ) from a mixture comprising more than 50% mole of a less adsorbable component (B1, B2 . . . ), this method comprising:

providing an adsorbent structure suitable for adsorbing the target species (A1, A2 . . . ), the structure being of the parallel passage contactor type.

and implementing cyclically the steps consisting in:

a) passing the feed stream through the adsorbent structure thus adsorbing the most adsorbable component (A1, A2 . . . ) and producing a stream depleted in this component and enriched in the less adsorbable one (B1, B2 . . . ).

b) heating the adsorbent structure to desorb the adsorbed species by means of circulating a fluid already enriched in the most adsorbable component at the regeneration temperature.

c) cooling the structure by means of passing through it with more than 50%, and preferably the totality, of the stream enriched in the less adsorbable component produced in the step a).

In order to have enough flow rate to heat and desorb the trapped components in a short time and not dilute these components in a purge gas containing not desired species, the purge gas has a composition close or identical to the "product".

For the cooling, the "off-gas" exiting the adsorber in the adsorption step is immediately used to push the heat front and decrease the temperature of another parallel passages contactor. To do it in time, this off gas should be in sufficient quantity, meaning that the non-adsorbed, or weakly adsorbed, species should represent more than 50% mole in the feed gas. This is typically true in the case of CO2 capture from a flue gas.

As complementary characteristics, the purge gas with a composition close or identical to the "product" has been produced at least partly during previous adsorption cycles, the circulation in a loop being made by means of a circulator, preferably a fan or a blower. A gas capacity (drum) will be used if necessary but the "product" pipe will be generally sufficient. A heater is installed some where in the loop. The heater is used to provide heating energy to heat gas to a desired regeneration temperature. However, in a special circumstance, it can also heat gas to extreme temperature, for example 300° C., for excessive adsorbent regeneration if needed. In order to prevent potential impurities from accumulating inside the loop, a guard bed downstream the pretreatment unit, such as a dryer, can be installed. Alternately, an exceptional regeneration process of packed adsorbent structure inside the bed can be carried out by periodically raise regeneration gas temperature to, for example, 300° C. with the same heater. This process will effectively remove all impurities from adsorbent structure, therefore, restore its adsorption capacity from time to time operation.

The desorption will occur during the whole heating phase and the desorbed gas can be released from the loop along the step b) which is at constant pressure or only at the end of this step. In that case, the pressure in the close loop is increased, depending on the quantity of gas desorbed and on the volume of the loop. It can be interesting to operate with some pressure to decrease the energy consumption and the size of the circulator. In fact, the heating pressure is independent of the adsorption pressure.

If necessary, the gas initially contained in the passages (voids) of the adsorbent structure (feed gas) is purged at the very beginning of step b) in order to maintain a high level of purity for the "product".

It is the same for the gas enriched in the most adsorbable component (product) present in the passages of the adsorbent structure at the end of step b) which can be recovered at the beginning of step c) and added to the "production".

Due to the straight flow channels of the adsorbent structure, the parallel passages allow to obtain plug flow of gases and minimize stagnant volume and to purge or recover the gas inside the channel with very little mixing with gas put in circulation.

If the targeted species are in relative high percentage in the feed, for instance more than 10%, the adsorption heat is likely to warm considerably the gas non adsorbed exiting the adsorbent structure, for instance from 10 to 25° C. depending on the energy of heat of adsorption, the heat capacity of the gas. It could be interesting in that case to cool down the regeneration gas before using it.

During a (large) part of the cooling step, the gas exiting the adsorbent structure is hot and it could be interesting to recover the heat available on this stream. This heat can help warming up the gas of the heating loop used in step b). Another application will be given below in an example of the method.

As mentioned early, the cycle time of conventional TSA is in hours. There is no incentive of operating a TSA at this cycle time by using an adsorbent structure packing. The new cycle time should be several folds less in order to take full advantages of structured packing to increase the productivity. However, it is not practical of operating the TSA at extremely short cycle time even with structured packing while still using standard equipment such valves, circulator . . . A good compromise is to have a TSA cycle time at least few minutes to less than an hour, preferably less or equal to half an hour. It means that the adsorption time step a), the heating time step b) and the cooling time step c) are all in the range from 1 to 20 minutes, preferentially in the range from 5 to 15 minutes. Note that the target cycle time with Rapid PSA using this kind of adsorbent structure is in seconds.

The number of adsorbers in operation depends on the application. All the known configurations can apply to this method. The more common is that the RTSA unit comprises 2 adsorbent structures, one in adsorption and the other successively in heating and cooling, the duration of step a) being equal to the duration of the regeneration steps. In a classical variant, the RTSA unit comprises 3 adsorbent structures, one in adsorption, the second in heating and the third in cooling step, the duration of the different steps being equal.

Figure 3:
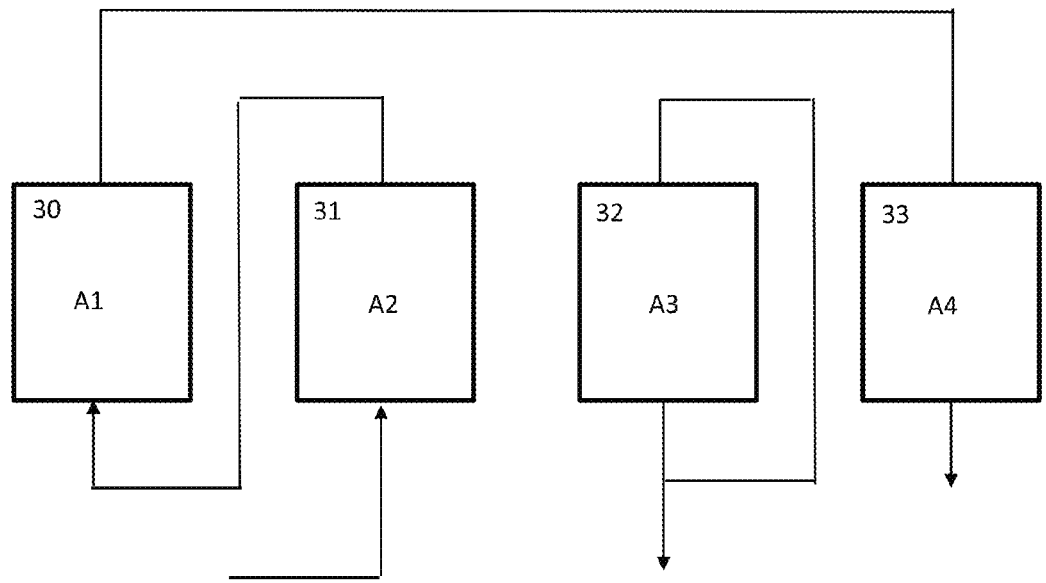
FIG. 3 is a schematic representation of one embodiment of the present invention.
Figure 3:
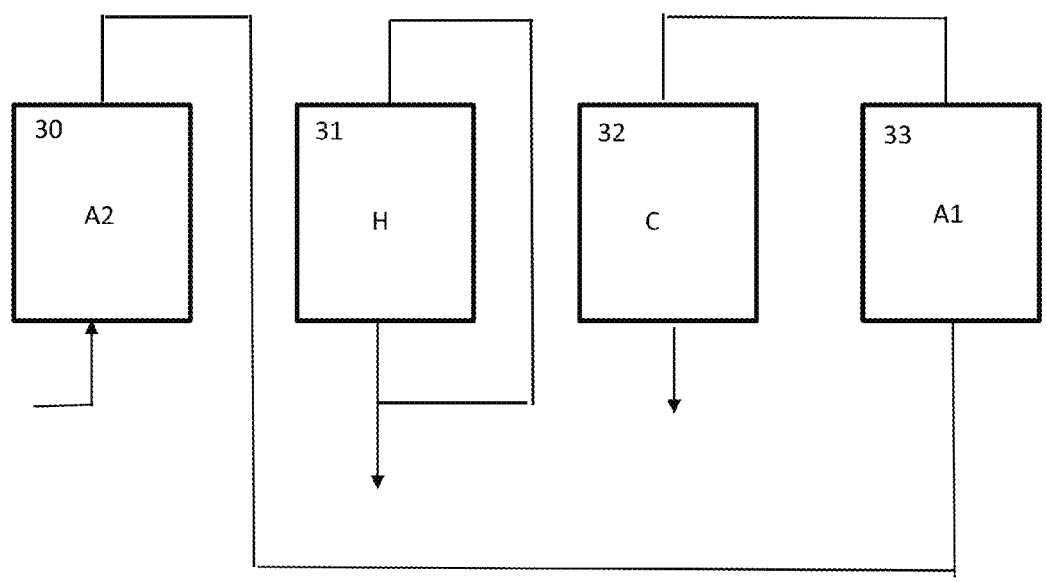

The same cycle is also used in 4 adsorbers configuration. Among these 4 adsorbers configurations, a particular cycle includes that of 2 adsorbers are simultaneously in adsorption phase as shown in FIG. 3 (adsorbers 31/30 in phase (I); adsorbers 30/33 in phase (i+1)). Each adsorber is fed initially (step A1) by the gas exiting the second one, seeing a low concentration of the most adsorbable component, then taking the place of the other (step A2) and being fed directly by the feed gas. Thus, the most adsorbable species (A1, A2 . . . ) can be extracted from a bed which has been saturated (step H), which is more efficient. However, one has to balance between performances and cost to choose the best cycle.

Each adsorber can comprise several structures (in different vessels) in operation in parallel. One adsorbent structure (in one vessel) can of course be made from several elementary structures, for instance several monoliths installed in parallel and/or in series.

All adsorbents could be used due to the fact that all of them can be produced in the shape of powder or small crystal and that technologies to make parallel passages contactors with such material are well known. The unique adsorbent, or the various adsorbents, in succession or mixture, are to be chosen in function of the application. This point is not developed here.

As already said, one important point in the method is to use a system with very low pressure drop. In most case, the feed gas will be near atmospheric pressure with very little pressure available (a few ten millibars) or will need a machine (compressor) to be extracted from the upstream process. Energy consumption can make the whole process being more difficultly industrialized. The adsorbent structure is therefore of the parallel passages contactor type, preferentially a monolith or honeycomb structure. A laminate packed or rolled structure, fabrics in parallel sheets or spiral wound structure, a fiber bundle structure are other possibilities.

Whatever the type of adsorbent structure used, one main particularity of the proposed method is to use a structure with large gas channel in the range 0.5 to 2 mm, even if this size is not well suited with this technology, giving usually too much low adsorbent loading. When speaking of channel whose section comprises a side with a dimension small in comparison with the other (rectangle), the thickness or width of the gas passage is clearly define. In other cases, it is less obvious (triangular shape, obstacle in the passage . . . ). A simple way to define a width in these particular geometries is to calculate the width of a channel with full passage to the gas which gives the same linear pressure drop than the adsorbent structure in question. This equivalent thickness should be in the range 0.5 to 2 mm.

In order to obtain a sufficient adsorbent loading, the present invention selects a structure with an important effective thickness of adsorbent, thus apparently withdrawing the main interest of the new structure which is, with a normal design, a large improvement of the transport properties (mass and heat). The preferred adsorbent effective thickness is in the range 0.25 to 1 mm, more preferentially between 0.5 and 0.8 mm.

Note that between the two adsorbent structure designs, one with usual 150μ adsorbent layer thickness and another according to the new method with for instance adsorbent layer thickness of 800μ, the mass transfer is divided by a factor approximatively 30. Local heat transfer is decreased accordingly.

With such unusual dimensions for the gas channel (1 mm for instance) and for the effective adsorbent thickness (800μ for instance), a parallel passages contactor can reach desired adsorbent loading. Considering a laminate structure with 50μ support substrate, the adsorbent loading is around 60%, roughly equivalent to what is obtained with a beaded particle bed.

Another way to define such adsorbent structure is to have the free volume available for the gas flow in the range 25/50% of the adsorbent structure. For a beaded particle bed, this free volume is in the range 35 to 40%.

In the most cases, such design is not interest. If one wants to make a RTSA with such design, the mass transfer zone will take a large part of the adsorber. Therefore, the adsorbent will be only partly used with a large quantity of unsaturated material and the productivity will be too low. This will be for instance the case of a FEP in front of an ASU in which the $CO_2$ present in the atmospheric air is to be removed from its initial content (450 ppm) down to 0.1 ppm, in order to not plug the cryogenic exchanger and for safety reason linked to the presence of an oxygen bath in the process. The ratio "impurity % in/% out" is above one thousand. It means that the whole mass transfer zone should be kept inside the adsorber and that of course a short mass transfer zone is imperative to be efficient. This is relatively general because for economical or safety reasons, most of the TSA removes the totality of at least one impurity.

In case of $CO_2$ capture application, the effect is different than most of the TSA process. $CO_2$ capture does not require the removal of the totality of the $CO_2$. Assuming a recovery of 90% which will be a very satisfactory target, a feed with a $CO_2$ content of 25% mole inlet will exit the adsorber with a final content higher than 3%. The ratio inlet/outlet is lower than 10, possibly around 5. A large part of the mass transfer zone is allowed to exit the adsorber. In that particular case, it is not a requirement for the mass kinetics to follow entirely the shortening ratio of the cycle.

Figure 1B:
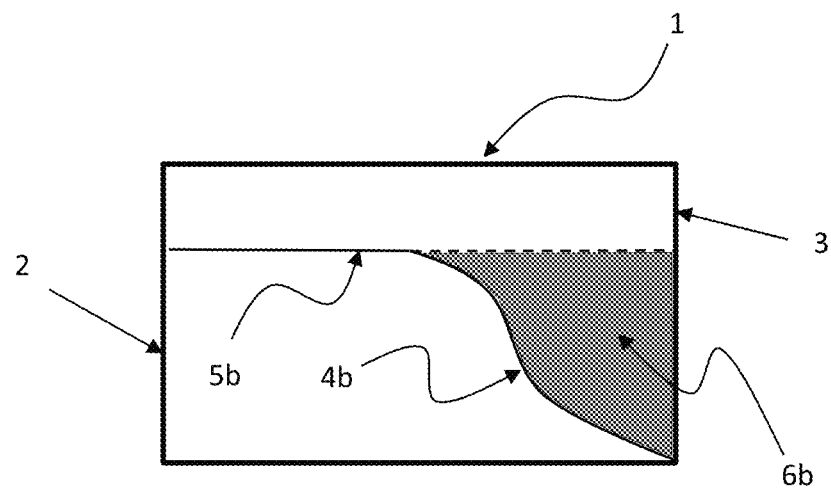
Figure 1C:
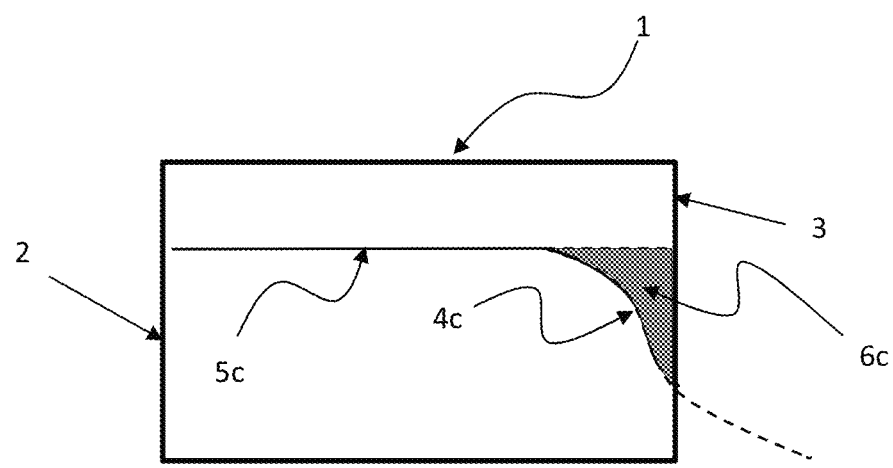

FIGS. 1A, 1B, and 1C illustrate the concept that average mass kinetics can lead to either poor or good productivity, depending on the application and particularly on the ratio "% inlet/% outlet". FIG. 1A shows schematically an adsorber bed 1 with a feed gas inlet 2 and a feed zone outlet 3, a mass transfer front 4a and a saturation zone 5a. The area indicated as 6a represents the adsorbent which is not saturated, thus corresponding to the mass transfer zone. Thus FIG. 1A represents the total removal of the adsorbed species. The mass transfer zone (MTZ) is completely captured inside the adsorber. Due to good kinetics, the length of the MTZ is short, and therefore most of the adsorbent is loaded. Hence, surface 6a represents only a small area.

A similar system is shown in FIG. 1B, but with a lower value of the kinetics, the MTZ is increased and area of 6b corresponding to the non-saturated adsorbent becomes important. The productivity in term of quantity of feed which can be treated is noticeably less than in the first case.

The kinetics shown in FIG. 1C is the same as in FIG. 1B but in this case the removal of the majority of adsorbed species is not required. With a 95%+ recovery (instead of 100%), one can see it is possible (see section 6c) to obtain as good productivity as in FIG. 1A.

The concept that this method is applied to applications for which one can allow the mass transfer zone to break out has another advantage. One specific problem with parallel passages contactors is the difficulty of obtaining tight geometrical tolerances. For most applications, PSA but also classical TSA (with total removal of impurities), one has to develop technology leading to a few % (generally less than 2 or 3%) both on the dimensions of gas channels and on the thickness of the adsorbent layers. With stiff mass transfer zone, the impurity is going out quickly and the adsorption phase is stopped as soon as there is a local breakthrough, even if it concerns only a small part of the adsorbent bed. In both cases, it decreases the productivity but it can also decrease the overall performances (lower recovery . . . ). When the mass transfer zone is allowed to exit the adsorber, the concentration profile of the impurity is more or less linear and there is a compensation between the points where the impurity concentration is higher than the target and the points where the impurity concentration is lower than the target. It means that a limited misdistribution of the gas or of the adsorbent (layer thickness) has not a sensible impact on the process. In that case a 5%, and even more, tolerance can be acceptable.

A way to characterize the fact that the mass transfer zone is breaking out is to say that the recovery of the most adsorbable component is less than 100%. A recovery of 97% means that 3% of this component goes on the average with the non adsorbed one. As the breakthrough occurs only towards the end of the adsorption step, say during the last third, the concentration in impurity at the end of adsorption could be relatively high. For instance for a 20% mole inlet, 97% recovery, the final concentration of the most adsorbable component could reach approximately 4% mole. A recovery range of 70 to 98% is a performance well adapted to this method of RTSA.

Another drawback of the design is, for the same reason, the poor efficiency of the heat transfer. To regenerate the adsorbent in the short time assigned, large flow rates are necessary both to heat then to cool the adsorbent. With a limited heat transfer, the totality of the energy will not be transferred to the adsorbent and the gas exiting the adsorber will contain some energy which generally is lost. As the regeneration is made through a close loop, in the present invention, the residual energy is recycled, the energy lost is therefore minimized. In compensation, the flow in circulation should be high enough to supply the necessary heat in a short time. One can see that it will be easier to recover a product (the more adsorbed species) with a high purity if this or these species are in sufficient concentration in the feed gas (at least a few mole %) and if the selectivity (ratio of adsorption loading) between the targeted components and the undesirable one is high. The present invention may not applicable to produce a gas present in traces (500 ppm for instance) in a carrier or if all the components are relatively similar in term of adsorption capacity.

As we dispose of a very large flow rate to cool the structure (at least 50% of the feed flow rate), this cooling will be achieved at the end of the available time even if the transfer from the gas to the adsorbent is not very efficient.

For these reasons, the preferred application of the proposed method corresponds to capturing $CO_2$ from a flue gas at near ambient pressure (<3 Bara), at ambient temperature (5 to 50° C.) with a concentration of $CO_2$ in the flue gas ranging from approximately 5 to 30%, with a balance of mostly nitrogen. The method is ecologically interesting and technically efficient when the capture of $CO_2$ is higher than 80%, preferentially higher than 90%. When proceeding according to the method, the $CO_2$ concentration in the $CO_2$ stream exiting the unit is higher than 80% mole, preferentially higher than 90% mole which is normally sufficient to dispose of the $CO_2$. Note that additional steps can be added to the method to increase the performances of the RTSA such as $CO_2$ purge, recycle, adsorbers in series during adsorption so that the $CO_2$ is extracted of a fully saturated adsorber. An example of such a unit will now be described in detail. We assume that the feed to the RTSA unit is a flue gas coming from a pre-treatment unit removing at least partly one or more impurities such as Hg, NOx, SOx, Water, dust, that at least part of the stream enriched in nitrogen produced in step a) of the RTSA cycle is used in the pre-treatment unit after flowing in the adsorbent structure to cool it down. More particularly, the pre-treatment unit comprises a drier, of the wheel type, and the stream enriched in nitrogen is used to heat and to cool the adsorbent of the wheel.

Figure 2:
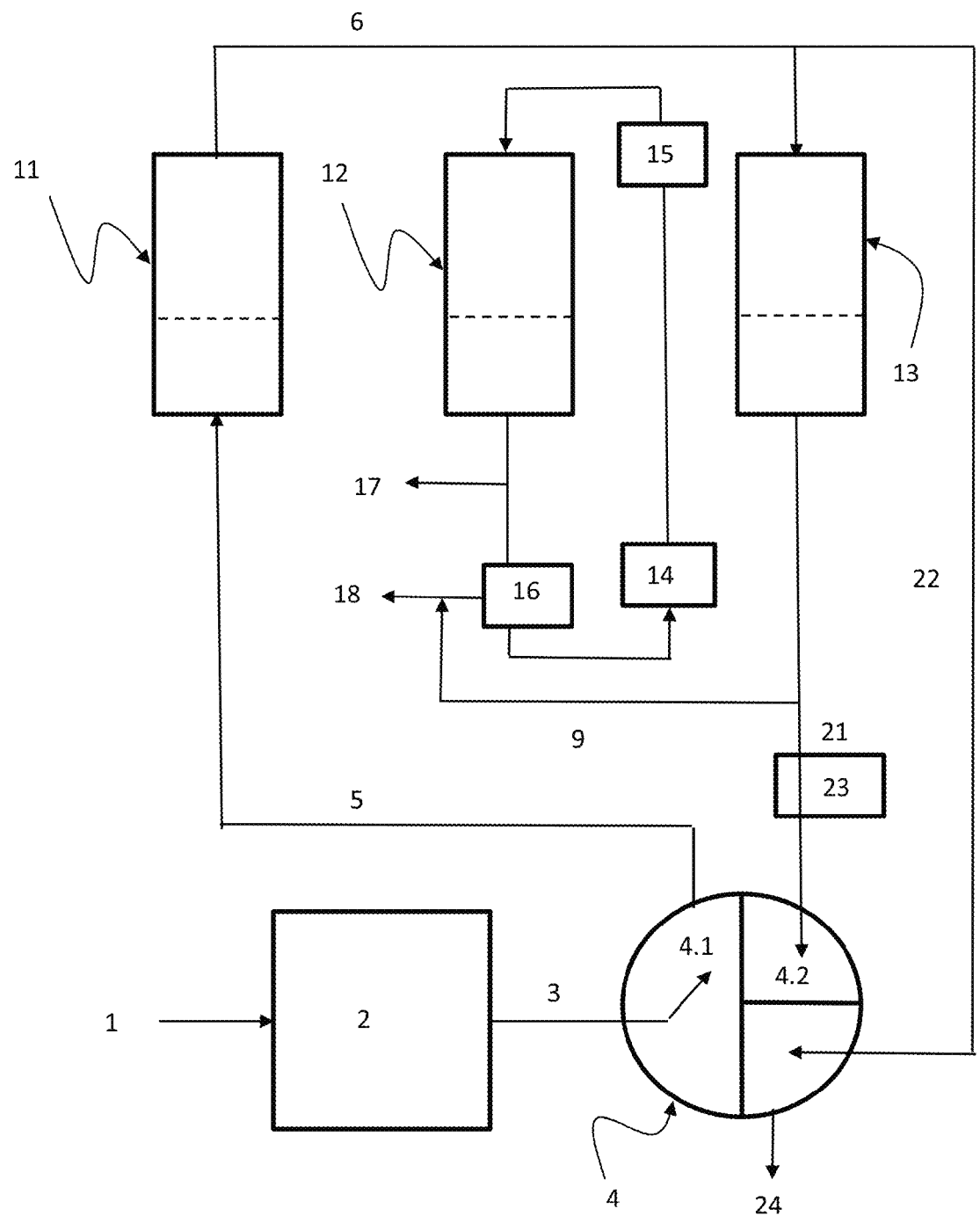
FIG. 2 is a schematic representation of one embodiment of the present invention.

The description corresponds to FIG. 2. The flue gas 1 coming from a combustion chamber (not represented) is treated in section 2 to remove dust, mercury and other potential pollutants such as nitrogen or sulfur oxides. Then, the gas 3 which composition at that point is mainly nitrogen—approx 80% mole-, $CO_2$-approx 15%-, the remaining being a few % of oxygen and argon, saturated with water, enters a drier 4, preferentially of the wheel type. The gas passes through the section 4.1 of the wheel in which it is dried then (5) is sent to the RTSA 10.

Adsorber 11 is in the adsorption step, 12 in the heating step, and 13 in the cooling step.

Each adsorber comprises a plurality of monoliths placed in an envelope with an inlet and an outlet. Several of them operate in parallel. The monoliths are made from X type zeolite. With a gas channel of 2*2 mm and a wall thickness of 1 mm (effective thickness 0.5 mm), the adsorbent loading is in the range of 50% which is economically acceptable. The gas 5 is fed to the adsorbent structure 11 until the $CO_2$ breakthrough to a level of 3% mole which should be reached according to the design in approximatively 10 minutes. As explained before with a ratio % in/% out of 5, instead of a ratio above 1000 in a FEP upstream an ASU, the productivity will not be a problem. The gas 6 exiting the structure is essentially nitrogen with few % of $CO_2$, $O_2$, and Ar.

During the same time, adsorber 12, in the same geometrical configuration as adsorber 11, is in the heating step. A rich $CO_2$ stream is in circulation by means of the fan 14. Other equipments in the loop are a heater 15 which allow reaching a temperature of 140° C., a drum 16.

At the start-up of the plant, some $CO_2$ coming from an external source can be sent to drum 16 in order to fill the circuit.

In order not to pollute the $CO_2$ desorbed by nitrogen, the gas initially contained in the structure is purged or vented through line 17. The $CO_2$ recovered from desorption of the adsorbed $CO_2$ is then discharged via line 18 during the step to maintain a constant gas pressure in the loop or may be released at the end of the step via line 18. Downstream the adsorbent structure and upstream the drum 16, an adsorption unit likely to remove some water traces brought with the process gas 5 can be put temporarily into operation (not represented). This is made to avoid any accumulation of humidity in the loop which can be detrimental to the $CO_2$ adsorption capacity (depending on the adsorbent). The design of the loop and of the equipments is such that the total pressure drop of the circuit remains very low (few ten millibars). The heating should be achieved in 10 minutes maximum. The flow rate in circulation could be as high as 50% of the feed flow rate. The temperature front inside the adsorbent structure is not very stiff due to transport limitations already discussed. It means that the temperature of the gas at the outlet of the structure will not go suddenly from ambient to 140° C. but will evolve during the duration of the step. The heater 15 compensates to obtain the final required temperature. Thus, there is no loss of energy.

During the same time, adsorber 13 is in the cooling step. The majority of stream 6 exiting the adsorbent structure 11 is sent to the third adsorber which is initially at 140° C. At the very beginning of the step c), the $CO_2$ contained in the channel is purged or vented towards the $CO_2$ product line via line 9. The adsorbent structure is cooled to ambient in less than 10 minutes and is ready to begin a new adsorption cycle.

The gas 21 exiting the adsorber is sent to the drier in order to regenerate the adsorbent (zone 4.2). Additional heat, if required, is added by means of the heater 23.

The flow of nitrogen 22 not used to cool the adsorbent structure (and to heat the wheel) is used to cool the wheel (zone 4.3).

Both flows are then sent to atmosphere (24). If the initial pressure at the outlet of the combustion chamber is not enough, a fan (not represented) has to be added somewhere on the circuit.

A Temperature Swing Adsorption method for separating a first component, comprising a more adsorbable component, from a feed stream comprising more than 50 mol % of a second component, comprising a less adsorbable component, the method comprising:
providing an adsorbent structure suitable for adsorbing the first component, the structure being of the parallel passage contactor type,
and cyclically implementing the steps consisting of:
a) passing the feed stream through the adsorbent structure thus adsorbing the first component and producing a stream depleted in the first component and enriched in the second component,
b) heating the adsorbent structure to desorb the adsorbed first component by means of circulating a heating stream enriched in the first component at a temperature suitable for regeneration,
c) cooling the structure by means of passing through it more than 50% of the stream enriched in the second component produced in the step a).

The adsorbent structure may cooled by having 100% of the stream enriched in the second component passes through the adsorbent structure pass through it. The recovery of the first component may be between 70 to 98%. In step b), the heating stream may be produced at least partly during at least one previous adsorption cycle. The heating stream may be circulated by means of a circulator. The circulator may be a fan or a blower.

The desorbed first component may be released from the loop during the whole step b). The desorbed first component may be released from the loop at the end of step b). The passages of the adsorbent structure may be purged or vented at the beginning of step b). The heating stream present in the passages of the adsorbent structure at the end of step b) may be recovered at the beginning of step c). The heating stream may be cooled down before entering the adsorbent structure.

The heat available in the stream enriched in the first component flowing out of the adsorbent structure may be recovered at least during a part of the cooling step c). The time required to complete step a), the time required to complete step b), and the time required to complete step c) may each be in the range from 1 to 20 minutes. The time required to complete step a), the time required to complete step b), and the time required to complete step c) may each be in the range from 5 to 15 minutes.

The method may comprise 2 adsorbent structures, wherein a first adsorbent structure is performing step a), and a second adsorbent structure successively performing step b) and step c), wherein the duration of step a) being equal to the combined duration of step b) and step c).

The method may comprise 3 adsorbent structures, wherein the first adsorbent structure is performing step a), a second adsorbent structure is performing step b), and a third adsorbent structure is performing step c), wherein the duration of the three steps are equal.

The method may comprise 2 or more adsorbent structures cyclically in series performing step a), the first component being extracted from the most saturated structure.

The adsorbent structure may be a parallel passages contactor, comprising a monolith structure, a honeycomb structure, a laminate packed structure, a rolled structure, fabrics in parallel sheets, spiral wound structure, or a fiber bundle structure. The adsorbent structure may comprises a gas channel thickness of between 0.5 and 2 mm. The adsorbent structure may comprises an adsorbent effective thickness of between 0.25 and 1 mm. The adsorbent structure may comprise a free volume available for the gas of between 25% and 50% of the adsorbent structure.

$CO_2$ from a flue gas may be captured at near ambient pressure, and at ambient temperature, with a concentration of $CO_2$ in the flue gas of between 5% and 30%, with a balance of mostly nitrogen. Ambient pressure may be <3 bara. Ambient temperature may be between 5° C. and 60° C. The capture of $CO_2$ may be higher than 80%. The capture of $CO_2$ may be higher than 90%. The $CO_2$ concentration in the desorbed stream may be higher than 80% mole. The $CO_2$ concentration in the desorbed stream may be higher than 90% mole.

The feed to the unit may come from a pre-treatment unit removing at least partly one or more impurities such as Hg, NOx, SOx, Water, dust. At least part of the stream enriched in the first component produced in step a) may be used in the pre-treatment unit. At least part of the stream enriched in the first component produced in step a) may be used in the pre-treatment unit after being used in step c). The pre-treatment unit may be essentially a drier, and wherein the stream enriched in the second component is used to heat the drier or to cool the drier or both of them. The drier may be a wheel type.

What is claimed is:

1. A Temperature Swing Adsorption method for separating a first component, comprising a more adsorbable component, from a feed stream comprising more than 50 mol % of a second component, comprising a less adsorbable component, the method comprising:
providing an adsorbent structure suitable for adsorbing the first component, the structure being of the parallel passage contactor type,
and cyclically implementing the steps consisting of:
a) passing the feed stream through the adsorbent structure thus adsorbing the first component and producing a stream depleted in the first component and enriched in the second component,
b) heating the adsorbent structure to desorb the adsorbed first component by means of circulating a heating stream enriched in the first component at a temperature suitable for regeneration,
c) cooling the structure by means of passing through it more than 50% of the stream enriched in the second component produced in the step a).

2. The method of claim 1, wherein the adsorbent structure is cooled by having 100% of the stream enriched in the second component that passes through the adsorbent structure pass through it.

3. The method of claim 1 wherein the recovery of the first component is between 70 to 98%.

4. The method of claim 1 wherein in step b), the heating stream is produced at least partly during at least one previous adsorption cycle.

5. The method of claim 1 wherein the heating stream is circulated by means of a circulator.

6. The method of claim 5, wherein the circulator is a fan or a blower.

7. The method of claim 4 wherein the desorbed first component is released from the loop during the whole step b).

8. The method of claim 7, wherein the desorbed first component is released from the loop at the end of step b).

9. The method of claim 1 wherein the passages of the adsorbent structure are purged or vented at the beginning of step b).

10. The method of claim 1 wherein the heating stream present in the passages of the adsorbent structure at the end of step b) is recovered at the beginning of step c).

11. The method of claim 1 wherein the heating stream is cooled down before entering the adsorbent structure.

12. The method of claim 1 wherein the heat available in the stream enriched in the first component flowing out of the adsorbent structure is recovered at least during a part of the cooling step c).

13. The method of claim 1 wherein time required to complete step a), the time required to complete step b), and the time required to complete step c) are each in the range from 1 to 20 minutes.

14. The method of claim 13, wherein time required to complete step a), the time required to complete step b), and the time required to complete step c) are each in the range from 5 to 15 minutes.

15. The method of claim 1 further comprising 2 adsorbent structures, wherein a first adsorbent structure is performing step a), and a second adsorbent structure successively performing step b) and step c), wherein the duration of step a) being equal to the combined duration of step b) and step c).

16. The method of claim 1 further comprising 3 adsorbent structures, wherein the first adsorbent structure is performing step a), a second adsorbent structure is performing step b), and a third adsorbent structure is performing step c), wherein the duration of the three steps are equal.

17. The method of claim 1 further comprising 2 or more adsorbent structures cyclically in series performing step a), the first component being extracted from the most saturated structure.

18. The method of claim 1 wherein the adsorbent structure is a parallel passages contactor, comprising a monolith structure, a honeycomb structure, a laminate packed structure, a rolled structure, fabrics in parallel sheets, spiral wound structure, or a fiber bundle structure.

19. The method of claim 1 wherein said adsorbent structure further comprises a gas channel thickness of between 0.5 and 2 mm.

20. The method of claim 1 wherein said adsorbent structure further comprises an adsorbent effective thickness of between 0.25 and 1 mm.

21. The method of claim 1 wherein said adsorbent structure further comprises a free volume available for the gas of between 25% and 50% of the adsorbent structure.

22. The method of claim 1 wherein $CO_2$ from a flue gas is captured at near ambient pressure, and at ambient temperature, with a concentration of $CO_2$ in the flue gas of between 5% and 30%, with a balance of mostly nitrogen.

23. The method of claim 22, wherein ambient pressure is <3 bara.

24. The method of claim 23, wherein ambient temperature is between 5° C. and 60° C.

25. The method of claim 22 wherein the capture of $CO_2$ is higher than 80%.

26. The method of claim 25, wherein the capture of $CO_2$ is higher than 90%.

27. The method of claim 22 wherein the $CO_2$ concentration in the desorbed stream is higher than 80% mole.

28. The method of claim 27, wherein the $CO_2$ concentration in the desorbed stream is higher than 90% mole.

29. The method of claim 22 wherein the feed to the unit comes from a pre-treatment unit removing at least partly one or more impurities comprising Hg, NOx, SOx, Water, dust.

30. The method of claim 29 wherein at least part of the stream enriched in the first component produced in step a) is used in the pre-treatment unit.

31. The method of claim 29, wherein at least part of the stream enriched in the first component produced in step a) is used in the pre-treatment unit after being used in step c).

32. The method of claim 31 wherein the pre-treatment unit is essentially a drier, and wherein the stream enriched in the second component is used to heat the drier or to cool the drier or both of them.

33. The method of claim 32, wherein the drier is a wheel type.

* * * * *